US012775630B2

(12) United States Patent
Wai

(10) Patent No.: US 12,775,630 B2
(45) Date of Patent: Oct. 27, 2026

(54) DATA TRANSFORMATION SYSTEM BETWEEN EXTERNAL BUSINESS AND ONLINE VIRTUAL PLATFORM, DATA TRANSFORMATION METHOD AND ELECTRONIC DEVICE

(71) Applicant: WAI'S CONSULTING SERVICES LIMITED, Hong Kong (CN)

(72) Inventor: Hai Bong Samson Wai, Hong Kong (CN)

(73) Assignee: WAT'S CONSULTING SERVICES LIMITED, Hong Kong (CN)

( * ) Notice: Subject to any disclaimer, the term of this patent is extended or adjusted under 35 U.S.C. 154(b) by 0 days.

(21) Appl. No.: 18/764,242

(22) Filed: Jul. 4, 2024

(65) Prior Publication Data

US 2026/0010544 A1 Jan. 8, 2026

(51) Int. Cl.
*G06F 16/25* (2019.01)

(52) U.S. Cl.
CPC .................................. *G06F 16/258* (2019.01)

(58) Field of Classification Search
CPC .... G06F 16/258; G06F 705/16; G06F 705/17; G06Q 10/10; G06Q 10/06
USPC .................................................. 705/17, 7.22
See application file for complete search history.

(56) References Cited

U.S. PATENT DOCUMENTS

| | | | | |
|---|---|---|---|---|
| 9,952,782 | B1 * | 4/2018 | Chandrasekaran | G06F 3/0607 |
| 12,026,846 | B2 * | 7/2024 | Lai | G06Q 30/0207 |
| 2006/0195378 | A1 * | 8/2006 | Jung | G06Q 40/02 705/35 |
| 2008/0167965 | A1 * | 7/2008 | Von Nothaus | G06Q 20/20 705/16 |
| 2009/0307608 | A1 * | 12/2009 | Kalasapur | A63F 13/12 715/753 |
| 2014/0162752 | A1 * | 6/2014 | Feldman | G06Q 20/06 463/20 |

OTHER PUBLICATIONS

Wright et al., Augmented Duality: Overlapping a Metaverse with the Real World, ACE2008: International Conference in Advances in Computer Entertainment Technology Yokohama Japan Dec. 3-5, 2008, pp. 263-266. (Year: 2008).*

Ye et al., ProAgent: From Robotic Process Automation to Agentic Process Automation, https://arxiv.org/abs/2311.10751, 2023, pp. 1-12. (Year: 2023).*

* cited by examiner

*Primary Examiner* — Cheyne D Ly
(74) *Attorney, Agent, or Firm* — HOWARD M COHN and Associates, LLC

(57) ABSTRACT

A data transformation method, applied to connecting an external business system and an online virtual platform, includes receiving and storing at least one first task request from the external business system; converting the stored at least one first task request into a second task request; sending the second task request to the online virtual platform, so that the second task request generates a corresponding virtual task on the online virtual platform; receiving and storing a second processing result from the online virtual platform; converting the stored at least one second processing result into a first processing result; and feeding back the first processing result to the external business system.

17 Claims, 3 Drawing Sheets

DATA TRANSFORMATION SYSTEM BETWEEN EXTERNAL BUSINESS AND ONLINE VIRTUAL PLATFORM, DATA TRANSFORMATION METHOD AND ELECTRONIC DEVICE

TECHNICAL FIELD

The present application relates to the field of data processing technology, in particularly to a data transformation system, a data transformation method and an electronic device.

BACKGROUND

Nowadays many businesses have undergone, or planned to undergo, digital transformation to enhance operational efficiency as well as being able to connect to their clients and suppliers. With the evolution of artificial intelligence and machine learning, many of the business processes can be tailored-made to utilize these for high level of automation. As a result, more and more computational power is required and in most of the cases these computational resources have to be purchased.

Therefore, how to effectively reduce computing power costs is an urgent issue that needs to be addressed.

SUMMARY

In the first aspect, the present application provides a data transformation system. The data transformation system includes a first data interface, configured to: receive a first task request from an external business system, and feed back a first processing result corresponding to the first task request to the external business system; a second data interface, configured to: send a second task request to an online virtual platform, and receive a second processing result corresponding to the second task request from the online virtual platform; a first data converter, configured to: convert the first task request into the second task request; a second data converter, configured to: convert the second processing result into the first processing result; a data storage module, configured to: store the first task request, the second task request, the first processing result, and the second processing result; wherein the first task request and the corresponding first processing result are conforming to a data model of the external business system; the second task request and the corresponding second processing result are conforming to a data model of the online virtual platform.

In the second aspect, the present application provides a data transformation method, applied to connecting an external business system and an online virtual platform. The data transformation method includes: receiving and storing at least one first task request from the external business system; converting the stored at least one first task request into a second task request; sending the second task request to the online virtual platform, so that the second task request generates a corresponding virtual task on the online virtual platform; receiving and storing a second processing result from the online virtual platform; wherein the second processing result is a task data information generated after at least one online virtual platform user completes the virtual task generated by the second task request; converting the stored at least one second processing result into a first processing result; wherein the first processing result is data information conforming to the description method of the external business system; feeding back the first processing result to the external business system.

One of the beneficial aspects of the data transformation method according to the present application is that the connection between the external business system and the online virtual platform is established, and the business task is transformed into a virtual task, which can effectively utilize the numerous users of the online virtual platform to provide support and assistance for the computing power required by the external business system, thereby the data processing cost of the external business system effectively reducing.

BRIEF DESCRIPTION OF THE DRAWINGS

One or more embodiments are illustrated by way of example and not by way of limitation in the figures of the accompanying drawings, wherein like reference numerals refer to similar elements. The drawings are not to scale, and some details within the drawings may not depict actual dimensions or locations of components.

DETAILED DESCRIPTION

For a better understanding of the present application, the present application will be described in more detail in conjunction with the accompanying drawings and specific embodiments. It should be noted that the terms “first”, “second”, “third”, etc. are used for descriptive purposes only and are not to be construed as indicating or implying relative importance.

Unless otherwise defined, all technical and scientific terms used herein have the same meanings as commonly understood by those skilled in the art to which the present application pertains. The terms used in this specification are merely for the purpose of describing particular embodiments and are not intended to limit the present application. The term “and/or” used herein includes any and all combinations of one or more of the associated listed items.

Furthermore, the technical features involved in the different embodiments described below can be combined with each other as long as they are not contradictory to each other. The technical features involved in the different embodiments described below can be combined with each other as long as they are not contradictory to each other.

During the implementation of this application, the applicant noticed that: for the whole digital ecosystem, every moment there is a very significant amount of processing power being consumed to provide entertainment and satisfaction to the device owners-online games. Almost all online games are played by a living human being to accomplish missions to acquire virtual rewards.

With the development of “Massively Multiplayer Online Role-Playing Game” (MMORPG) and metaverse, it is possible to link the “business worlds” to the “virtual worlds” together in a win-win situation. The “business worlds” can utilize real human intelligence while the “virtual worlds” can acquire both virtual and real rewards. It will be beneficial to society if this computation power can be used to assist in business processing. On one hand companies can save on computation power while the online virtual platform users can earn real or virtual assets in return.

Figure 1:
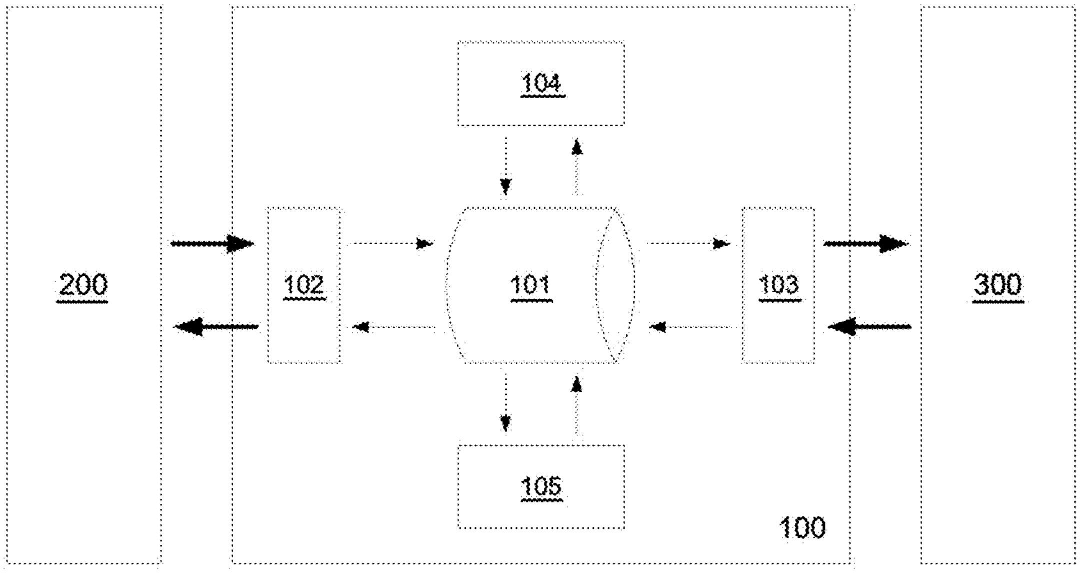
FIG. 1 is a schematic diagram of a data transformation system according to an embodiment of the present application.

FIG. 1 is a schematic diagram of a data transformation system provided by an embodiment of the present application. As shown in FIG. 1, the data transformation system 100 is connected to at least one external business system 200 and at least one online virtual platform 300 to implement data transformation between the external business system and the online virtual platform.

In this embodiment, the external business system 200 can be any type of commercial digital platform. It can execute a series of logical processing operations on one or more business data according to the user's needs or actual situation requirements, and obtain corresponding processing results for the user.

The term "first task request" is used to represent the target task initiated by the external business system 200. It can be a request to execute a specific business process on specific business data. The term "first processing result" is used to represent the task data and information generated after the completion of the target task, which can be presented in an appropriate form.

For example, the first task request can be to count the total leave time of all employees of the company in a certain quarter. Correspondingly, the first processing result can be the statistical result of the leave time of all employees presented in a tabular form.

The online virtual platform 300 is an electronic online platform for providing and presenting a virtual world. Typically, for example, an open-world game based on virtual reality technology. In the virtual world provided by the online virtual platform, there are usually many different virtual tasks that players or users can claim and execute, providing a good experience for players or users.

The term "second task request" can be used to represent at least one virtual task. In other words, after receiving the second task request, the online virtual platform can generate a corresponding virtual task in the virtual world based on it. The term "second processing result" is used to represent the task data collected by the online virtual platform after the completion of the virtual task.

For example, the second task request can be a computing task in the virtual world, requiring the counting and statistics of the number of sheep or trees in a specific area. Correspondingly, the second processing result will be the final counted number of sheep or trees determined by the player or user.

In summary, in the present application, the first task request and the corresponding first processing result are conforming to the data model of the external business system 200, while the second task request and the corresponding second processing result are conforming to the data model of the online virtual platform 300. Data interaction between the two is achieved through data transformation by the data transformation system 100.

Please refer to FIG. 1 again, the data transformation system 100 includes: a data storage module 101, a first data interface 102, a second data interface 103, a first data converter 104, and a second data converter 105.

The data storage module 101 is a functional module with data storage capability. It can select any suitable type of storage medium or storage form according to the actual situation requirements, and provide sufficient storage space.

The data storage module 101 is the database of the entire data transformation system 100. It can store all first task requests, first processing results, second task requests, and second processing results in an appropriate form, to facilitate the transfer of these data between different functional modules.

The first data interface 102 is a functional module connected to the external business system 200. It is configured to: receive the first task request from the external business system, store the first task request in the data storage module 101, and feed back the first processing result corresponding to the first task request to the external business system.

The second data interface 103 is a functional module connected to the online virtual platform 300. It is configured to: obtain at least one second task request from the data storage module 101, send the second task request to the online virtual platform, and after receiving the second processing result corresponding to the second task request from the online virtual platform, store the second processing result in the data storage module 101.

The transformation between different data is mainly realized by the cooperation of the first data converter 104 and the second data converter 105.

The first data converter 104 can read at least one first task request from the data storage module 101, and based on the data model of the online virtual platform 300, convert the first task request into a second task request, and store the second task request in the data storage module 101 again.

The second data converter 105 can read at least one second processing result from the data storage module 101, and based on the data model of the external business system 200, convert it into a first processing result, and store the first processing result in the data storage module 101 again.

By utilizing the above data transformation system, the target task initiated by the external business system can be converted into a virtual task that can be executed on the online virtual platform, and by setting task rewards or one or more other methods, encourage players or users participating in the virtual world to complete the virtual task.

Preferably, to adapt to different situations, the set task reward can be dynamically adjusted. For example, when the target task to be completed is more urgent or more difficult, a higher task reward can be set to encourage more players or users to complete the virtual task.

The virtual task data generated after the completion of the virtual task is also converted through the above data transformation system into the target task data required by the external business system and provided to the user of the external business system.

Thus, the target task of the external business system can indirectly utilize the computing power of players or users in the virtual world, effectively improving the efficiency of computing power utilization, and reducing the cost for the external business system to complete the target task.

In some embodiments, the first task request may include: a business process and business data of a target task initiated by at least one external business system.

The term "business process" refers to a series of activities that an enterprise or organization performs in an orderly manner to achieve a specific goal. The term "business data" refers to the data and information generated, collected and used by an enterprise or organization in its operation process. These two types of data information basically constitute a complete target task.

Correspondingly, in the process of converting the first task request into the second task request, the business process can be converted into a script of the online virtual platform task, while the business data can be converted into a virtual object of the online virtual platform.

The term "script" refers to pre-defined instructions or steps in the online virtual platform for automatically executing certain tasks or processes. Specifically, the script can be code, configuration files, or other forms of instruction sets. The term "virtual object" refers to a virtual entity or element defined, managed, and used in the online virtual platform, which can be data structures, user interface components, virtual items, characters, etc.

Typically, the business data may contain some data information that is not desired to be disclosed or made public. For example, personal information or product sales data. In the present application, such data information is referred to as "private data".

In some other embodiments, appropriate specific processing can be performed on the private data in the business data during the transformation process, and the private data can be converted into identification information of the virtual object, to avoid improper disclosure of the private data and protect the private data.

The term "identification information" refers to attributes or information used in the online virtual platform to identify and distinguish different virtual entities. It can be presented in various forms, including but not limited to virtual object names, virtual object descriptions, and virtual object operation permissions.

In some embodiments, the first data interface 102 and the second data interface 103 are both application programming interfaces.

The application programming interface is a specific software intermediary that allows two applications to communicate with each other. It defines a set of rules and protocols, through which software developers can use specific functions or access specific data without needing to know the underlying implementation details.

Thus, both the external business system 200 and the online virtual platform 300 can easily access or connect to the data transformation system 100 to achieve data interaction between them.

Specifically, the application programming interface includes: data structures corresponding to all data used in the data transformation system; data formats describing the business process; data formats describing the business data; and the communication connection method between the external business system, the data transformation system, and the online virtual platform.

It should be noted that in the embodiments of the present application, the functional modules named by their functionality are used as examples to describe in detail the method steps to be implemented by the data transformation system provided by the embodiments of the present application. Those skilled in the art should understand that, in combination with the description of the examples of functional modules and method steps disclosed herein, they can be implemented by electronic hardware, computer software, or a combination thereof.

To clearly illustrate the interchangeability of hardware and software, the components and steps of the various examples have been generally described in functional terms in the above description. Whether these functions are implemented as hardware or software depends on the particular application and design constraints. Those skilled in the art can use different methods to implement the described functions for each particular application, but such implementation should not be construed as departing from the scope of the present application.

Based on the above data transformation system, the present application embodiment further provides a data transformation method. The data transformation method is used to connect the external business system and the online virtual platform, so that at least a portion of the target tasks initiated by the external business system can be completed through players or users of the online virtual platform, reducing the computing power cost required for completing the target tasks.

Figure 2:
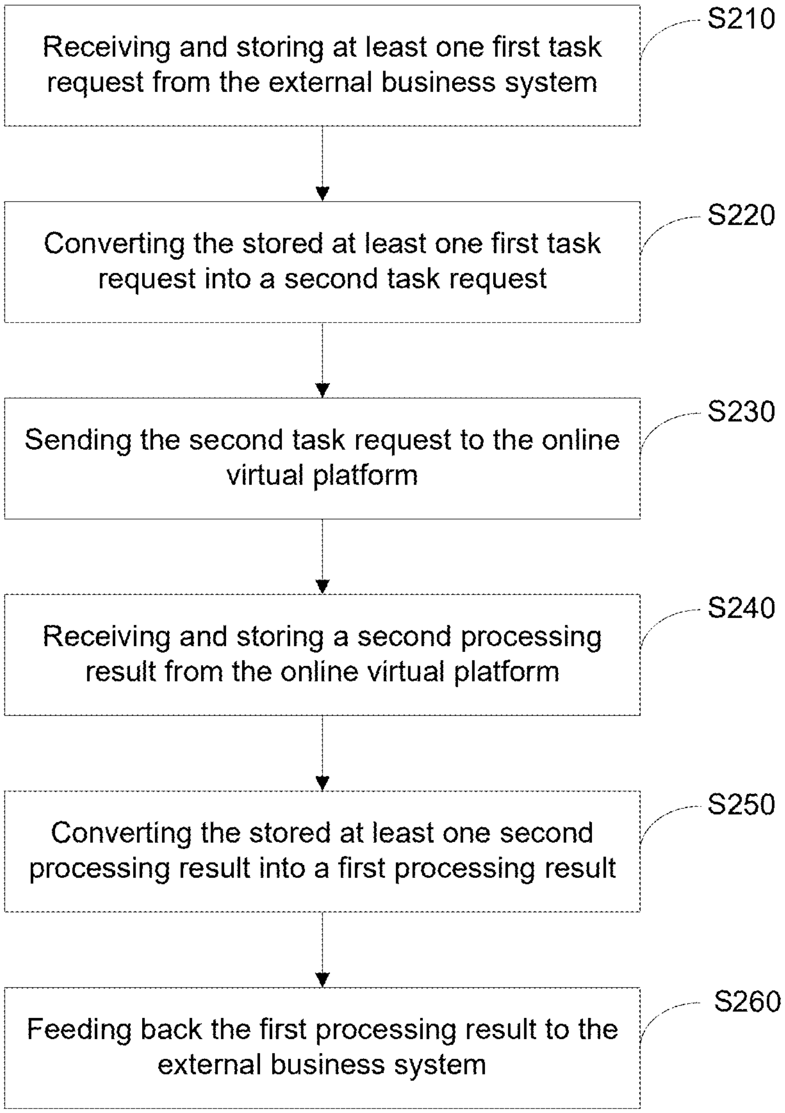
FIG. 2 is a schematic diagram of a data transformation method according to an embodiment of the present application.

FIG. 2 is a schematic diagram of a data transformation method provided by an embodiment of the present application. As shown in FIG. 2, the data transformation method includes the following steps:

S210, receiving and storing at least one first task request from the external business system.

The first task request refers to at least one target task that needs to be completed. It can be initiated by one or more external business systems.

S220, converting the stored at least one first task request into a second task request.

The generated second task request includes a task script and a virtual object, which can be presented as a specific virtual task on the virtual platform.

S230, sending the second task request to the online virtual platform, so that the second task request forms a corresponding virtual task on the online virtual platform.

Based on the received task script and virtual object definition, the online virtual platform publishes one or more virtual tasks in the virtual world for the avatars played by players to claim and complete.

S240, receiving and storing a second processing result from the online virtual platform.

The second processing result is task data information generated after at least one online virtual platform user (e.g., player) completes the virtual task generated by the second task request. This task data information represents the final task processing result of the virtual task.

S250, converting the stored at least one second processing result into a first processing result.

The first processing result refers to data information conforming to the description method of the external business system. After collecting the second processing result, it still needs to be converted back into the form of the first processing result according to the data model of the external business system through a corresponding transformation algorithm.

S260, feeding back the first processing result to the external business system.

After obtaining the first processing result corresponding to the first task request through transformation, it can be fed back to the external business system through the aforementioned first data interface to complete the target task.

In the present application, the corresponding relationship between each first task request, second task request, second processing result, and first processing result can be properly recorded and marked in the memory to ensure that the fed back processing result is correct.

Based on the above data transformation method, the present application embodiment further provides an electronic device. This electronic device can be used to execute the above data transformation method to implement the above data transformation system and establish data interaction between one or more external business systems and one or more online virtual platforms.

Figure 3:
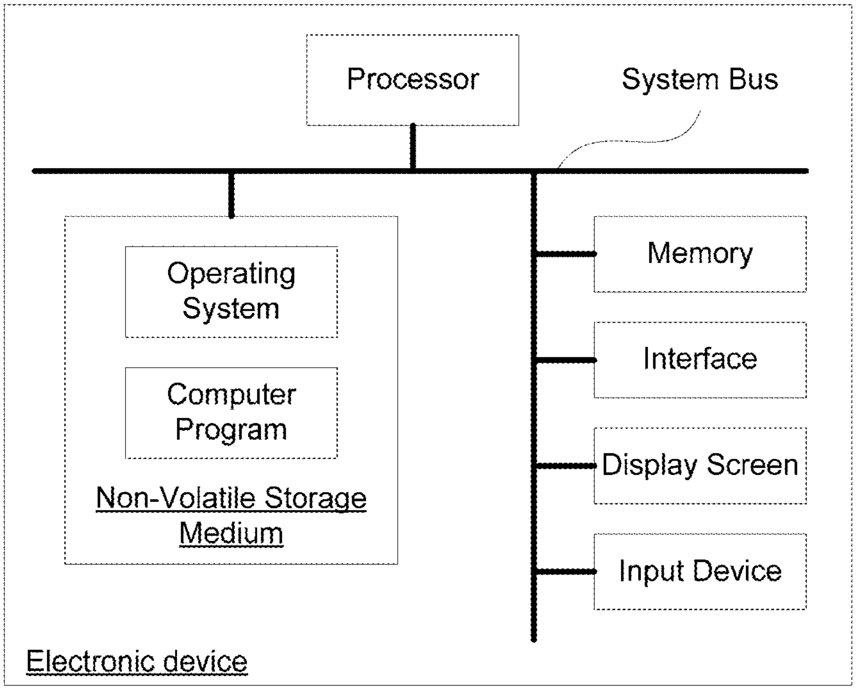
FIG. 3 is a schematic diagram of an electronic device according to an embodiment of the present application.

FIG. 3 is a structural schematic diagram of the electronic device provided by an embodiment of the present application. As shown in FIG. 3, the electronic device includes: a processor, a memory and at least one interface, which are connected through a system bus.

The processor of the electronic device provides computing and control capabilities. The electronic device further includes a non-volatile storage medium. The non-volatile storage medium stores an operating system and a computer-readable instructions.

The memory provides an environment for running the operating system and computer-readable instructions in the non-volatile storage medium. The memory of the electronic device is used to store the aforementioned first task request, second task request, second processing result, and first processing result data.

The interface of the electronic device is used for communication with external electronic computing platforms (e.g., external business systems and online virtual platforms). When the computer-readable instructions are executed by the processor, the data transformation system described above can be implemented.

Finally, it should be noted that: the above embodiments are merely used to illustrate the technical solutions of the present application and are not intended to limit them; under the idea of the present application, the technical features in the above embodiments or different embodiments can also be combined, and the steps can be implemented in any order. There are many other variations of the various aspects of the present application as described above, which are not provided in detail for the sake of simplicity. Although the technical solutions of the present application have been described in detail with reference to the foregoing embodiments, those skilled in the art should understand that they can still modify the technical solutions recorded in the foregoing embodiments or substitute some technical features with equivalent features; and such modifications or substitutions do not make the corresponding technical solutions deviate from the scope of the technical solutions of the various embodiments of the present application.

What is claimed is:

1. A data transformation system between external business system and online virtual platform, comprising:

one or more processors;

one or more non-transitory computer-readable storage medium coupled to the one or more processors; and computer-executable instructions stored on the one or more non-transitory computer-readable storage medium that, when executed by the one or more processors, cause the system to implement:

a first data interface, configured to: receive a first task request from an external business system, and feed back a first processing result corresponding to the first task request to the external business system;

a second data interface, configured to: send a second task request to an online virtual platform, and receive a second processing result corresponding to the second task request from the online virtual platform;

a data storage module, configured to: store the first task request, the second task request, the first processing result, and the second processing result;

a first data converter, configured to: read at least one first task request from the data storage module, and based on a data model of the online virtual platform, convert the first task request into the second task request;

a second data converter, configured to: read at least one second processing result from the data storage module, and based on a data model of the external business system, convert the second processing result into the first processing result;

wherein the first task request and the corresponding first processing result are conforming to the data model of the external business system; the second task request and the corresponding second processing result are conforming to the data model of the online virtual platform, the data model of the external business system and the data model of the online virtual platform are heterogeneous;

wherein the second task request includes a script of the online virtual platform task and a virtual object of the online virtual platform, wherein the online virtual platform is an electronic online platform for providing and presenting a virtual world, the external business system is a commercial digital platform;

whereby, based on the received task script and virtual object definition, the online virtual platform publishes one or more virtual tasks in the virtual world for players or users to claim and complete, wherein the second processing result includes task data information generated after at least one online virtual platform player or user completes the virtual task generated based on the second task request;

wherein the corresponding relationship between each first task request, second task request, second processing result, and first processing result is recorded in the data storage module.

2. The data transformation system between external business system and online virtual platform according to claim 1, wherein the first task request comprises a business process and business data of a target task initiated by at least one external business system.

3. The data transformation system between external business system and online virtual platform according to claim 2, wherein the business process is converted into the script while the business data is converted into the virtual object, so that the target task initiated by the external business system is converted into a corresponding virtual task on the online virtual platform.

4. The data transformation system between external business system and online virtual platform according to claim 3, wherein the business data further comprises: a private data and the private data is converted into an identification information of the virtual object, for protecting the private data.

5. The data transformation system between external business system and online virtual platform according to claim 3, wherein the virtual task is set with a task reward, so that the virtual task is completed by at least one online virtual platform user to generate the second processing result.

6. The data transformation system between external business system and online virtual platform according to claim 3, wherein the task reward is dynamically adjustable.

7. The data transformation system between external business system and online virtual platform according to claim 2, wherein the first data interface and the second data interface are application programming interface (API).

8. The data transformation system between external business system and online virtual platform according to claim 7, wherein the application programming interface includes:

a data structure corresponding to all data used in the data transformation system;

a data format describing the business process;

a data format describing the business data; and a communication connection method between the external business system, the data transformation system, and the online virtual platform.

9. The data transformation system between external business system and online virtual platform according to claim 8, wherein the first data interface is further configured to: transfer the received first task request into the business process and the business data in a corresponding data format, and store the business process and the business data in the data storage module.

10. The data transformation system between external business system and online virtual platform according to claim 8, wherein the second data interface is further configured to: transfer the received second processing result into the virtual task data in a corresponding data format, and store the virtual task data in the data storage module.

11. A data transformation method, applied to connecting an external business system and an online virtual platform, comprising:

receiving and storing at least one first task request from the external business system;

converting the stored at least one first task request into a second task request based on a data model of an online virtual platform;

sending the second task request to the online virtual platform, so that the second task request generates a corresponding virtual task on the online virtual platform;

receiving and storing a second processing result from the online virtual platform; wherein the second processing result is a task data information generated after at least one online virtual platform user completes the virtual task generated by the second task request;

converting the stored at least one second processing result into a first processing result based on a data model of an external business system; wherein the first processing result is data information conforming to the description method of the external business system;

feeding back the first processing result to the external business system;

wherein the first task request and the corresponding first processing result are conforming to the data model of the external business system; the second task request and the corresponding second processing result are conforming to the data model of the online virtual platform, the data model of the external business system and the data model of the online virtual platform are heterogeneous;

wherein the second task request includes a script of the online virtual platform task and a virtual object of the online virtual platform, wherein the online virtual platform is an electronic online platform for providing and presenting a virtual world, the external business system is a commercial digital platform;

whereby, based on the received task script and virtual object definition, one or more virtual tasks are published in the virtual world of the online virtual platform for players or users to claim and complete, and wherein the second processing result includes task data information generated after at least one online virtual platform player or user completes the virtual task generated based on the second task request;

wherein the corresponding relationship between each first task request, second task request, second processing result, and first processing result is recorded.

12. The data transformation method according to claim 11, wherein the first task request comprises a business process and business data.

13. The data transformation method according to claim 12, wherein the step of converting the stored at least one first task request into the second task request specifically comprises:

converting the business process into a task script of the online virtual platform; and converting the business data into a virtual object of the online virtual platform.

14. The data transformation method according to claim 11, wherein the method further comprises: setting a corresponding task reward for the virtual task, so that the virtual task is completed by at least one online virtual platform user.

15. An electronic device, comprising: a processor and a non-volatile storage medium, the non-volatile storage medium storing computer program; when the computer program are executed, causing the processor to execute the data transformation method according to claim 1.

16. The electronic device according to claim 15, wherein the electronic device is connected in parallel with one or more external business systems and one or more online virtual platforms; and different external business systems are connected in parallel with the electronic device, and different online virtual platforms are connected in parallel with the electronic device.

17. A non-transitory computer-readable storage medium storing computer-executable instructions which, when executed by one or more processors, cause the one or more processors to perform the data transformation method according to claim 11.

* * * * *